United States Patent
McKnight et al.

(10) Patent No.: US 6,744,443 B2
(45) Date of Patent: Jun. 1, 2004

(54) TIME SEQUENTIAL LOOKUP TABLE METHOD FOR A DISPLAY

(75) Inventors: Douglas J. McKnight, Boulder, CO (US); Douglas J. Gorny, Boulder, CO (US); Lowell F. Bohn, Jr., Boulder, CO (US)

(73) Assignee: Brillian Corporation, Tempe, AZ (US)

( * ) Notice: Subject to any disclaimer, the term of this patent is extended or adjusted under 35 U.S.C. 154(b) by 151 days.

(21) Appl. No.: 09/989,764

(22) Filed: Nov. 19, 2001

(65) Prior Publication Data

US 2002/0030691 A1 Mar. 14, 2002

Related U.S. Application Data (63) Continuation of application No. 09/312,196, filed on May 14, 1999, now Pat. No. 6,373,497, application No. 09/989,764, and a continuation-in-part of application No. 09/542,432, filed on Apr. 4, 2000, now Pat. No. 6,329,971, which is a continuation of application No. 08/994,033, filed on Dec. 18, 1997, now Pat. No. 6,046,716, which is a continuation-in-part of application No. 08/801,994, filed on Feb. 18, 1997, now Pat. No. 6,078,303, application No. 09/989,764, which is a continuation-in-part of application No. 08/770,233, filed on Dec. 19, 1996, now Pat. No. 5,920,298, and a continuation-in-part of application No. 08/920,602, filed on Aug. 27, 1997, now Pat. No. 6,104,367, and a continuation-in-part of application No. 08/920,603, filed on Aug. 27, 1997, now Pat. No. 6,144,353.

(51) Int. Cl.[7] ................................................. G09G 5/02
(52) U.S. Cl. ........................ 345/602; 345/519; 345/206
(58) Field of Search ................................. 345/519, 206, 345/204, 205, 88, 600–602, 605, 536

(56) References Cited

U.S. PATENT DOCUMENTS

| 5,355,443 | A | * | 10/1994 | Kim et al. ................... 345/431 |
| 5,673,058 | A | * | 9/1997 | Uragami et al. ............... 345/3 |
| 5,699,076 | A | * | 12/1997 | Tomiyasu .................... 345/103 |
| 5,717,697 | A | * | 2/1998 | Yin ............................. 714/722 |
| 5,736,137 | A | | 4/1998 | Anderson et al. |
| 5,801,665 | A | * | 9/1998 | Zhaog et al. ................ 345/600 |
| 5,838,389 | A | * | 11/1998 | Mical et al. ............. 345/199 X |
| 5,867,134 | A | * | 2/1999 | Alvelda et al. ................. 345/8 |
| 5,959,598 | A | * | 9/1999 | McKnight ..................... 345/90 |
| 6,046,716 | A | * | 4/2000 | McKnight ..................... 345/95 |
| 6,097,362 | A | * | 8/2000 | Kim ............................ 345/87 |
| 6,108,000 | A | * | 8/2000 | Bolotski et al. ............. 345/212 |
| 6,166,724 | A | * | 12/2000 | Paquette et al. ............ 345/199 |
| 6,373,497 | B1 | * | 4/2002 | McKnight et al. .......... 345/602 |

FOREIGN PATENT DOCUMENTS

| EP | 0 707 305 | 4/1996 |
| EP | 0 745 969 | 12/1996 |
| EP | 0 915 361 | 5/1999 |
| EP | 0 875 881 | 3/2000 |

OTHER PUBLICATIONS

Ammer, J., Bolotski, M., Alvelda, P., Knight, Jr. T., "A 160×120 Pixel Liquid–Crystal–on–Silicon Microdisplay with an Adiabatic DACM", 1999 IEEE International Solid–State Circuits Conference, pp. 212–213.*

Bolotski, M., Alvelda, P., "Low–Power Miniaturized Information Display Systems", ISLPED 98, Aug. 1998, pp. 279–281.*

Cheng, P., Huang, H., "Electronics Development of Silicon Microdisplays for Virtual Reality Applications", Proceedings of the ASP–DAC '99, 1999, pp. 197–200.*

(List continued on next page.)

Primary Examiner—Ulka J. Chauhan
(74) Attorney, Agent, or Firm—Baker Botts L.L.P.

(57) ABSTRACT

A method and apparatus employing lookup tables in a time sequential manner. A substrate has a display, a digital to analog converter, and a lookup table (LUT) formed thereon. The LUT is loaded with a LUT data set corresponding to an image subframe to be driven to the display. Successive LUT data sets corresponding to the next subframe are loaded after each subframe is driven to the display.

17 Claims, 5 Drawing Sheets

OTHER PUBLICATIONS

Schuck, M., McKnight, D., Johnson K., "Smart Pixel LCOS devices for Projection Display Systems", IEEE/LEOS 1996 Summer Topical Meetings, 1996, pp. 11–12.*

Underwood, Ian, "VLSI Design and Fabrication for Liquid–Cystal on Silicon", IEE Seminar on Microdisplay and Smart Pixel Technologies, 2000, pp. 7/1–7/6.*

MicroDisplay Press Release, "The MicroDisplay Corporation Makes Display Integration Breakthrough", Jul. 1998.*

Ammer, J., et al. "A 160×120 Pixel Liquid–Crystal –on–Silicon Microdisplay with an Adiabatic DACM", 1999 IEEE International Solid State Circuits Conference, pp. 212–213.*

Underwood, Ian, "VLSI Design and Fabrication for Liquid–Crystal on Silicon", IEE Seminar on Microdisplay and Smart Pixel Technologies, 2000, pp. 7/1–7/6.*

PCT International Search Report for PCT Application No. PCT/US00/012983, mailed Sep. 11, 2000.

* cited by examiner

TIME SEQUENTIAL LOOKUP TABLE METHOD FOR A DISPLAY

This application is a continuation of U.S. patent application Ser. No. 09/312,196, filed May 14, 1999 now U.S. Pat. No. 6,373,497. This application also hereby claims the benefit of, as a continuation-in-part of, the following prior U.S. patent application Ser. No. 09/542,432, filed Apr. 4, 2000 now U.S. Pat. No. 6,329,971, which is a continuation of U.S. patent application Ser. No. 08/994,033, filed Dec. 18, 1997 now U.S. Pat. No. 6,046,716, which is a continuation-in-part of U.S. patent application Ser. No. 08/801,994, which was filed on Feb. 18, 1997 now U.S. Pat. No. 6,078,303, which is a continuation-in-part (CIP) of U.S. patent application Ser. No. 08/770,233, which was filed on Dec. 19, 1996 now U.S. Pat. No. 5,920,298. This application is also a CIP of U.S. patent application Ser. Nos. 08/920,602 and 08/920,603, both of which were filed on Aug. 27, 1997 now U.S. Pat. Nos. 6,104,367 and 6,144,353. This present application hereby claims the benefit of these earlier filing dates under 35 U.S.C. § 120.

BACKGROUND (1) Field of the Invention

The invention relates to data structures and display systems More specifically, the invention relates to formation and use of a data structure such as a lookup table on a single substrate with a display system.

(2) Background

Liquid crystal displays have been known generally for many years. Initially, liquid crystal displays were formed on amorphous silicon substrates. Amorphous silicon tended to be slow, relatively large, and unsuited for formation of high speed logic and other device types. Liquid crystal displays then evolved into a polysilicon style which still had inadequate speed and logic compatibility characteristics. More recently, crystalline silicon has been employed to manufacture very small liquid crystal on silicon (LCOS) displays. These displays are much faster than the displays which use polysilicon to form display devices and can permit high speed driving of the individual pixels on display. In miniature displays, the challenge is to make the displays as small as possible and to also minimize power consumption, as these displays are increasingly used in a mobile environment with limited power resources.

The use of lookup tables (LUTs) is generally understood in the art. A LUT is effectively a listing of output codes which correspond to the possible input codes. The LUT performs a mapping of the input code to the output code, though the input code and output code may have different ranges. Typically, when LUTs are used in the context of displaying graphical data, three LUTs are employed to carry output codes corresponding to each of the color components (e.g. red, green, and blue) of a pixel. The subsequent three output codes are all simultaneously driven to the display to create the image of the color specified. Using three LUTs per pixel implies non-trivial die space to form the three LUTs, as well as power consumption by all those tables. In the context of miniature displays, it is desirable to minimize both die space and power consumption.

Because driving consecutive positive frames may cause liquid crystal malfunctions, liquid crystal display pixels are invariably driven by an alternating voltage having a positive and negative swing. While this places certain powering constraints on the system, it also necessitates use of frame inversion techniques in which the frame data is inverted to be driven by a negative signal. The required data inversion increases complexity of the display controller as well as power consumption and die are required.

It is also known in the art that liquid crystal displays can be damaged if exposed to DC voltage for a significant period of time. Thus, efforts have been made to reduce the risk of such damage. However, in the case of systems where the display is remote from the display controller, improper cable connections, a crash at the controller, or even a damaged cable can cause large and damaging voltages to be driven to a liquid crystal display. The problem arises how to protect the display from damages as a result of likely faults. Solutions to this problem are largely absent in the existing art.

BRIEF SUMMARY OF THE INVENTION

A method and apparatus employing lookup tables in a time sequential manner is disclosed. A substrate has a display, a digital to analog converter (DAC), and a lookup table (LUT) formed thereon. The LUT is loaded with a LUT data set corresponding to an image subframe to be driven to the display. Successive LUT data sets corresponding to the next subframe are loaded after each subframe is driven to the display. The display in the substrate may be a liquid crystal display or a light emitting diode display or other types of displays. The substrate may be a semiconductor substrate such as a silicon semiconductor having integrated circuits formed therein. The display may be disposed on the same substrate with the LUT or a different substrate, and the DAC may be disposed on the same substrate with the LUT or on a different substrate.

An example of a method of the present invention converts display data from a first set of values to a second set of values through the use of a LUT.

A plurality of lookup table (LUT) data sets are retained in a storage device. The LUT on a display chip is loaded on a first LUT data set of the plurality. Then a first plurality of signals corresponding to a subframe of an image to be displayed are sent to the LUT. A next LUT data set of the plurality may be loaded into the LUT. Once the next LUT data set has been loaded, a second plurality of signals corresponding to a next subframe of an image to be displayed may be sent to the LUT.

DETAILED DESCRIPTION

Figure 1A:
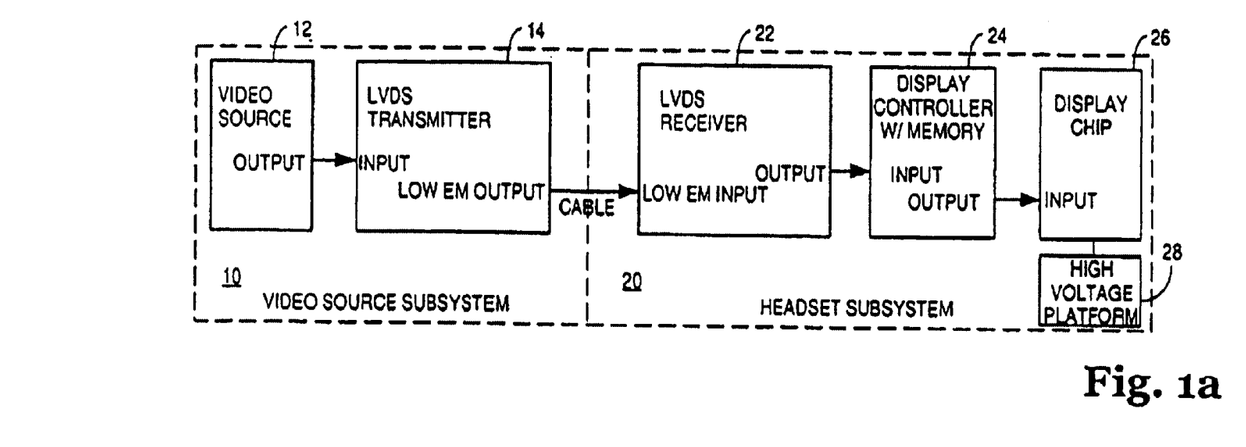
FIGS. 1a and 1b are block diagrams of alternative configurations of a display system of one embodiment of the invention.
Figure 1B:
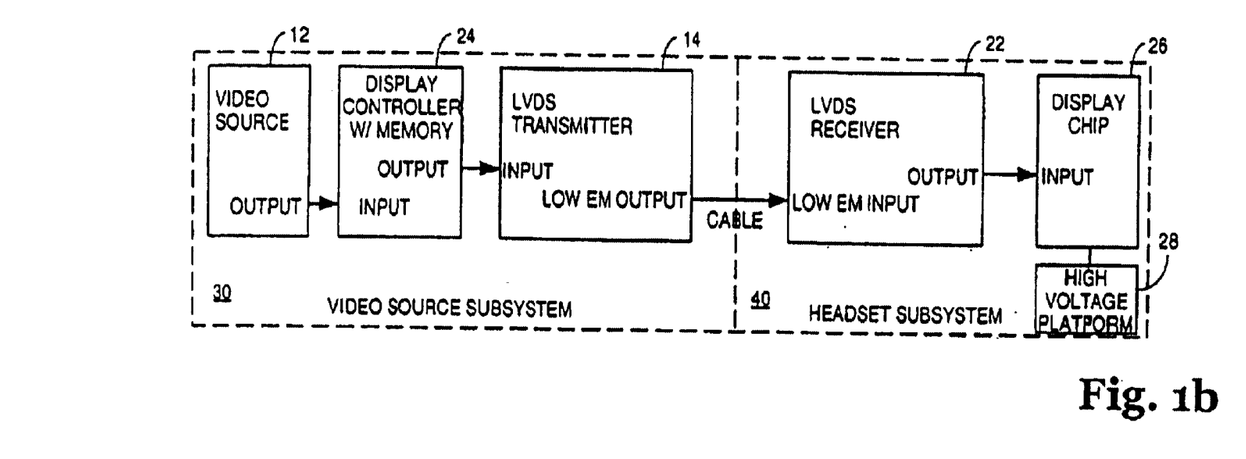

FIGS. 1a and 1b are block diagrams of alternative configurations of a display system of one embodiment of the invention. In FIG. 1a, a video source subsystem 10 includes a video source 12 coupled to a low voltage differential signaling (LVDS) transmitter 14. LVDS transmitters and receivers are commercially available, and LVDS signaling is generally well-known in the art. A video signal from the video source 12 is converted by the LVDS transmitter and transmitted in a standard manner across a cable to an LVDS receiver 22 in headset subsystem 20. A display controller with embedded memory 24 receives the output of the LVDS receiver 22 and stores the subframes of the image data in the embedded memory. Subframes are then sent out to display chip 26 which is also within the headset subsystem 20. A high voltage platform 28 within the headset subsystem 20 is coupled to the display chip 26 and responsible for driving the cover glass voltage (CGV) of the display. In an alternative embodiment, by changing certain design parameters, the CGV may be driven from the display substrate. For example, the CGV range could be restricted to be driven by a voltage range that can be supplied directly from the display substrate such as 0 to 5 volts.

FIG. 1b shows a system employing the same components in a slightly different configuration. Specifically, video source subsystem 30 has video source 12 coupled to display controller with memory 24 (possibly embedded) which in turn provides its output to the LVDS transmitter 14 to be cabled to the LVDS receiver 22 in the headset subsystem 40. The display chip 26 then receives the output of the LVDS receiver 22 and is supplied power in the same manner by high voltage platform 28 as described with reference to FIG. 1a above. The flexibility of the display controller and memory 24 to provide or receive LVDS signaling and also the display chip 26 to receive LVDS signaling permits significant flexibility in system design. Co-pending U.S. patent application No. 09/222,230, filed Dec. 29, 1998, describes an example of a display which may be used with embodiments of the invention, including the systems of FIG. 1a or 1b; that application is hereby incorporated by reference.

Figure 2:
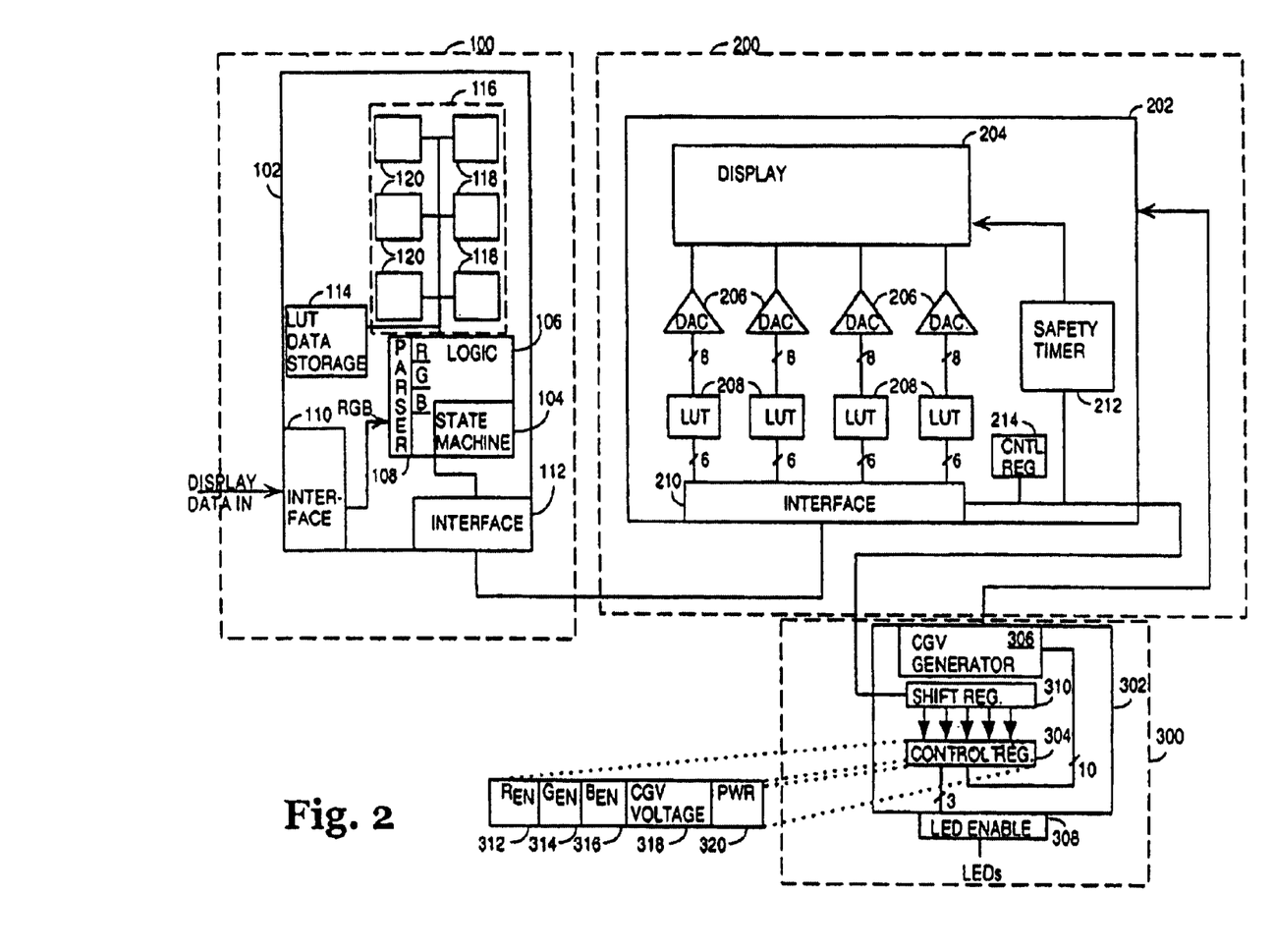
FIG. 2 is a block diagram of a display system of one embodiment of the invention.

FIG. 2 is a block diagram of a display system of one embodiment of the invention. In this diagram, LVDS transmitters and receivers are not shown, but it is within the scope and contemplation of the invention to configure the system of FIG. 2 as shown in 1a or 1b, or the LVDS components may be omitted entirely. The system is segregated into three distinct power zones, 100, 200, 300. Power zone 200 includes a substrate 202 which has a display 204 formed thereon. In one embodiment, display 204 is a liquid crystal on silicon (LCOS) display. Also formed on substrate 202 are a plurality of digital to analog converters (DACs) 206 which drive display 204. Coupled to the DACs and also formed on substrate 202 are a plurality of lookup tables (LUTs) 208 in a one-to-one correspondence with the DACs. A set of control registers 214 are formed on substrate 202 and used to control the function of the other devices formed on substrate 202 and also provide control signals to a high-power platform in power zone 300. A safety timer 212 is formed on a substrate 202. Safety timer 212 is used to drive the display into a safe state in the event of certain system malfunctions. Safety timer 212 is described in further detail with respect to FIGS. 4 and 5 below. Interface 210 formed on substrate 202 may be a LVDS compliant interface and is responsible for directing incoming data appropriately to the LUTs 208 or the control register space 214. The control register space includes registers required to manage display functions and registers to hold control information to be sent to substrate 302 (discussed below). Among the control registers are a DAC standby register to power and remove power from the DACs, a start of frame registers to signal the start of a new frame, LED enable register, and a cover glass voltage register. Additional useful registers will occur to one of ordinary skill in the art. Typically, the display 204 occupies 80–90% of the die space of substrate 202. It operates at a 5 V level and is driven by TTL level outputs. Thus, the formation of the devices on substrate 202 should be formed with a process having a feature size compatible with these needs. It has been found that 0.8 μfeature size is satisfactory. For even lower power consumption, a 0.45 μfeature size could be used for substrate 202, while still maintaining 5 V operation if desired.

Substrate 202 is coupled to a substrate 302 which resides in power zone 300. Substrate 302 is manufactured with a much larger feature size because of its voltage requirements. Particularly, the cover glass voltage (CGV) generator 306 generates the voltage for the cover glass of the display 204. In one embodiment, the cover glass voltage requirements dictate that it be driven between a +6 V and −2 V. Co-pending U.S. patent application Ser. No. 08/801,994, filed Feb. 18, 1997, and U.S. patent application Ser. No. 08/994,033, filed Dec. 18, 1997, describe examples of voltages which may be applied to a cover glass in exemplary embodiments, and these applications are hereby incorporated by reference. To supply this range, a larger feature size needs to be employed in the formation of CGV generator 306. A 3 μprocess has been found suitable. Also on substrate 302 is part of an LED driver 308 which enables the red, green and blue LEDs which illuminate the display 204 in a time sequential manner. Because it uses a significantly larger process, operations on substrate 302 occur at a much slower rate than, for example, on substrate 202. Moreover, for space reasons, it is desirable to keep the circuitry on substrate 302 to a minimum. A simple data interface exists between substrate 202 and substrate 302 consisting of three lines, a data-in line, a clock line, and a load line. The data-in supplies data to a shift register 310 which shifts data into the shift register 310 responsive to the clock. Once the shift register 310 is full, a load signal along the load line causes the data in the shift register 310 to be transferred to control register 304. Control register 304 is shown exploded out. It contains three LED enables, Red Enable 312, Green Enable 314, and Blue Enable 316. These values are provided to the LED driver 308 and are the basis on which the LED driver 308 drives the corresponding LEDs. CGV 318 is a ten bit value that is provided to the CGV generator 306 from which the CGV generator 306 generates the appropriate voltage for the cover glass over substrate 202. A final bit of control register 304 is the power bit 320 which causes substrate 302 to be powered or not powered, depending on whether the power bit is active.

Also coupled to the substrate 202 is display controller substrate 102 existing within power zone 100. A coupling of substrate 102 to substrate 202 may be local or via cable through a pair of LVDS interfaces. Substrate 102 includes a logic unit 104 which functions as a display controller for the display. The logic unit 104 includes a state machine 106 which drives data in a color sequential manner to the display. A parser 108 may also be provided which accepts data in an RGB format and converts it to a parallelization of R, and then G, and then B. A storage unit 116, which may be embedded dynamic random access memory (DRAM), is also formed on substrate 102. A storage unit should include at least two logically distinct subunits.

By using two to six logically or physically distinct subunits, each with its own memory interface, a number of advantages are obtained. By way of example, because the display is driven in a time sequential manner with a clock speed of 100 MHz and four pixels are to be supplied to the display for each clock, a data rate of 400 megapixels from the memory to the display is required. This data rate must be maintained for an entire subframe which, for a 480,000 pixel display of one embodiment of the invention, is approximately 1.2 milliseconds. If no parser is provided such that the data is stored in RGB format, three times the data rate between memory and a temporary storage, such as a FIFO, is required. Moreover, the FIFO must be large enough to supply sufficient subframe data while the incoming image frame occupies the memory interface. Additionally, relatively large FIFOs must be supplied on the incoming side to hold the data while the output side (or another subunit of the input side) is being serviced. Even with the parser present such that the data is stored in separate logical storage areas, first red, then green, then blue, the complexity of the memory controller and FIFO is required for each subunit increase in both power usage and die space. In this example, the memory controller would need to handle four data streams (three in, one out) with different clock rates between the streams in and the streams out. By employing six independently accessible memory subunits (two sets of three, one for each subframe of the current frame, and one for each subframe of the next frame), each with their own memory interface, memory access is significantly simplified such that a simpler memory controller may be employed, smaller or no FIFOs may be used, and the memory to outgoing FIFO operational speed can be significantly reduced.

As shown, storage unit 116 is shown composed of six subunits 120 and 118. Each subunit is presumed to have it own independent memory interface in this embodiment of the invention. Because a frame will be displayed simultaneously with one being loaded, the system ping pongs back and forth between subunits 118 and subunits 120 for loading/displaying. A LUT data storage unit 114 which may be part of storage unit 116 or formed as a separate memory type, such as SRAM, is also provided. LUT data storage 114 retains six LUT data sets, one corresponding to each of R, G, B, $\overline{R}$, $\overline{G}$, $\overline{B}$. This permits the system to use an inverted LUT data set rather than inverting the data itself, providing greater flexibility in the inverting algorithm. Another embodiment permits the use of only three LUT data sets R, G, and B with inverses generated by logic 106. In such embodiments, a small amount of storage is saved at a cost of more stringent DAC linearity requirements.

In one embodiment, interfaces 110 and 112 are both LVDS compliant, allowing greater flexibility in the positioning of the controller relative to the display. Interface 110 may optionally provide conversion from a YUV format to RGB format. Additionally, either interface 110 or parser 108 truncates incoming color data by dropping the two least significant bits thereby changing the resolution from eight bits per color to six bits per color, as stored in a storage unit 116. This permits the controller chip to send four pixels (of six bits each) simultaneously to the display chip using standard LVDS techniques. The lookup table then maps the six bits into eight bits. A set of LUT data is basically a listing of output codes that correspond to each possible input code. Since the shown embodiment uses six bit input code, that implies 64 output codes selected from a 256 possible output codes. This expansion of codes permits the LUT to perform gamma correction, correct for the non-linearity of the system components, and address other human factors. Notably, since the 64 output codes are of eight bits each, moving a LUT data set in the shown embodiment is accomplished by moving 64 bytes of data. This is a trivial percentage of the data moved in a subframe. Moreover, there is a period of time after the subframe data is loaded into the display during which the liquid crystal is permitted to settle. Then there is a period during which the display is illuminated. During these periods, the LUT and the display controller are mostly unused. Thus, the load of the LUT data set can be accomplished during these periods with no impact on system timing.

Though the embodiment above describes a six to eight bit encoding through the LUT, it is within the scope and contemplation of the invention to perform other encodings. For example, a two to eight encoding would permit four colors to be selected from a very large palette and permit extremely high speed pixel throughput as twelve pixels could be processed simultaneously using the current 24 bit data path, assuming the twelve LUTs and twelve DACs are also provided. It is also within the scope and contemplation of the invention that the output coding may be greater than eight bits. Such merely increases the size of the LUT data set and provides a larger palette from which to select output codes.

In the typical course of operation, a first frame is loaded into, for example, subunits 118 as three distinct subframes, e.g. a red subframe, a green subframe, and a blue subframe. A state machine 106 then begins feeding the subframes to the display substrate 202 preceded by an appropriate LUT data set. In addition to the 24 data signals moving between controller substrate 102 and display substrate 202, there are also a mode signal, a reset signal, a clock signal, and a chipselect signal. The chipselect signal permits the display controller to drive multiple displays by selecting only the one to which the frame should be sent. The mode signal selects between a register mode and a data mode. In data mode, four pixels of data are moved across the 24 lines on each clock. In register mode, the data lines become nine address lines, eight data lines, a read line and a write line (with five lines unused). It is in register mode that LUT writes and register writes occur. It will be recognized that these twenty-eight signals are readily transferred using LVDS techniques.

The LUT is loaded first with an appropriate LUT data set corresponding to the immediately following subframe and provides the necessary mapping of six bit color data to eight bit display data. The LUT data set is selected to accommodate for non-linearities in the DACs 206 and the liquid crystal response to the particular color. LUTs may also be used to perform gamma correction, for example. While to first order, e.g. R and $\overline{R}$ LUT data sets are true inverses of each other, in reality, secondary effects such as the difference in non-linearity of the liquid crystal or the DAC when exposed to a negative voltage may require greater difference between the positive and inversed LUT data set. This ability to compensate for these differences provides improved image quality of standard frame inversion techniques. Because a relatively small amount of data is required for LUTs, moving it from the controller chip to the display chip has a negligible effect on system efficiency. It is also possible to load all four LUTs simultaneously with the same data, thereby increasing the efficiency of the transfer. By loading the LUTs before each subframe, the number of LUTs required on the display chip is reduced. This saves space and reduces power consumption of the overall system.

Subsequently, the color data is applied to the LUTs with one pixel to each LUT, thus, four pixels (in the same monochrome subframe) are processed simultaneously and then driven by the DACs onto the display. An entire subframe is driven to the display after which the display is illuminated by the corresponding LED color. Subsequently, the other two subframes are in turn driven to the display and illuminated. It should be recognized that the particular ordering of the red, green, blue subframes may be arbitrary.

Additionally, it is desirable, when driving a liquid crystal display, to toggle between driving a positive subframe and driving an inverse subframe to protect the display from deleterious effects of constant voltage difference conditions. Accordingly, as mentioned above, the LUT data set selected to be driven to the LUT will alternate between a positive data set and an inverse data set.

Figure 3:
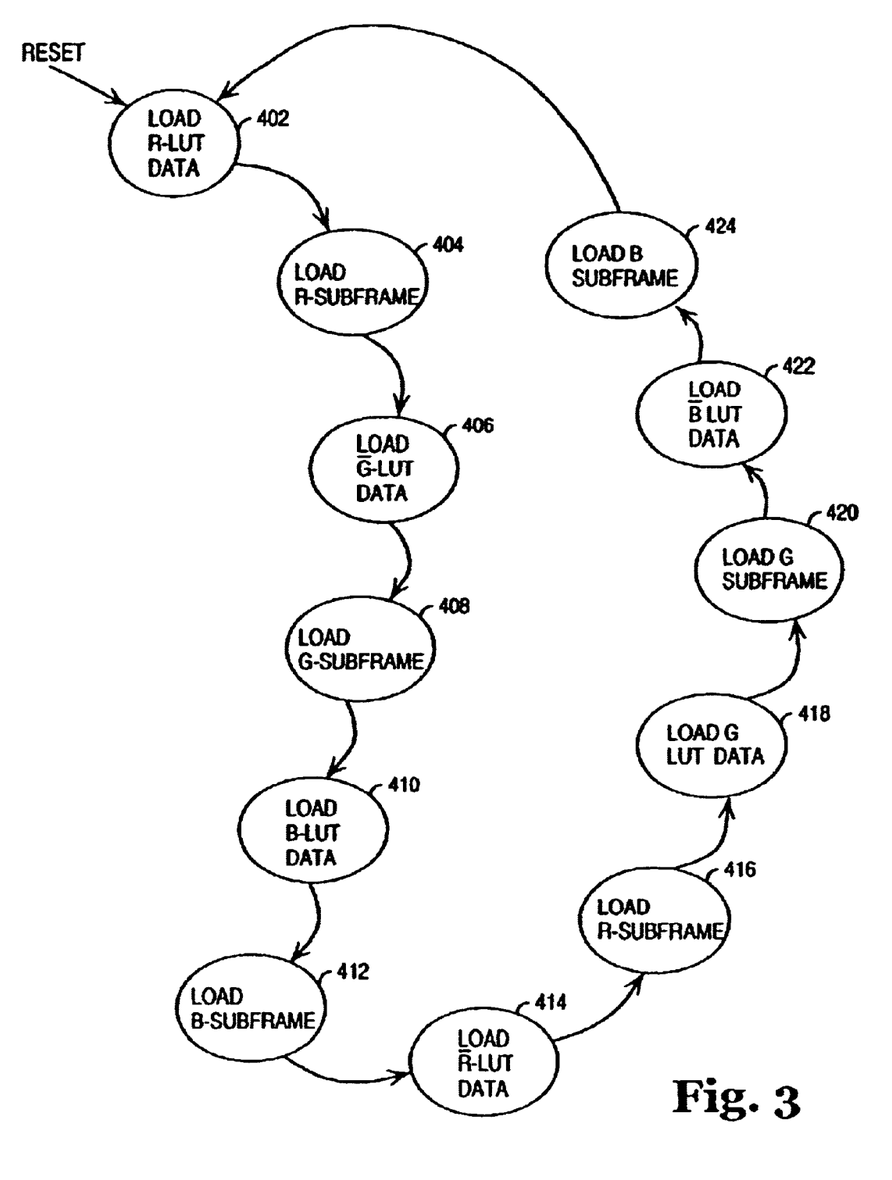
FIG. 3 is an exemplary state diagram of one embodiment of the state machine.

FIG. 3 shows an exemplary state diagram of one embodiment of state machine 106. Upon reset, the state machine enters a load R LUT data state. In this state, the LUT data set corresponding to R is loaded into the LUT on substrate 202. In the case of FIG. 2, the four LUTs receive the same LUT data for the red subframe in order to drive four separate pixels. Alternatively, when a different number of pixels is being driven (e.g. one pixel), then the substrate 202 would include the same (e.g. one) number of LUTs. A state machine then advances to the load R subframe state 404. In this state, the R data from the logically distinct R buffer in storage unit 116 is passed through the LUTs and the corresponding values driven to corresponding pixels on the display 204. The state then advances to the load $\overline{G}$ LUT data state 406. In this state, the LUTs on substrate 202 are loaded with a data set corresponding to $\overline{G}$. The G subframe is then driven to the LUTs and the corresponding encoding is driven to the display four pixels at a time. Then at state 410, the LUTs are loaded with a B LUT data set and the state advances to the load B subframe 412. As with the subframes before it, the B subframe is driven to the display. By rapidly displaying the monochrome subframes, the human eye integrates the subframe to perceive a full color image. The incoming and outgoing subunits of storage unit 116 swap for the next series of states.

The $\overline{R}$ LUT data set is then loaded into the LUTs at state 414 and a next red subframe (in this case, from R subbuffer 120) is driven through the LUTs and DACs to the display at state 416. The state advances to state 418 in which the G LUT data set is loaded into the LUTs. The state then advances to 420 and the G subframe from G subbuffer 120 is driven to the display, and so forth, at states 422 and 424 for the $\overline{B}$ LUT data and the corresponding B subframe. The state machine 104 then returns to state 402 and begins driving R LUT data again, as long as state machine 104 remains in the active displaying mode.

It is within the scope and contemplation of the invention to redisplay the data in the current subbuffer again before swapping subbuffers if the incoming data rate does not match the outgoing data rate one to one. Thus, if the input rate is one half the output rate, each frame would be displayed twice before a swap. Analogous cases exist for greater disparities between input and output rates.

Another embodiment uses only one set of subbuffers in storage unit 116 to hold data to be displayed. In this embodiment, parser 108 allows the subbuffer, e.g. 118, to be randomly written with new pixel data during the times when the subbuffer is not being accessed to provide data to the display. In this case, the same order as described above with reference to FIG. 3 occurs, but no swap of subbuffers is used. This ordering is repeated over and over, allowing input access during the non-displaying time.

While in the embodiment of FIG. 3, only six LUT data sets are used and only a single display loop exists within the state machine, it is within the scope and contemplation of the invention to have multiple display loops and an arbitrary large number of groups of data sets. For example, one embodiment of the invention might use one group of LUT data sets $R_1, G_1, B_1, \overline{R}_1, \overline{G}_1, \overline{B}_1$, for temperatures below a certain threshold and a second group $R_2, G_2, B_2, \overline{R}_2, \overline{G}_2, \overline{B}_2$, for temperatures above the threshold. The corresponding state machine would look like FIG. 3 duplicated with temperature selecting the loop of states through which the state machine transitions. Similar, different groups of data sets may be used for different frame rates or different contrast settings, environmental conditions, liquid crystal, etc. Other bases for using multiple groups of data sets are also within the scope and contemplation of the invention. For example, for an LED display (rather than a liquid crystal display), the LUT data sets may require R, G, B and no inverted sets.

Detection of fault conditions in a display is important to avoid damage to the display. As used herein, fault means anything affecting the status of the circuitry or software driving the display or the display itself. A number of problems may occur that cause the display to become hung up with a constant CGV and a DC voltage across the liquid crystal. Even with small voltage differences between the cover glass and the underlying pixels, damage may occur to the liquid crystal. Examples of fault that my occur include a crash of the display controller or the host video source that causes the display controller to leave its display state machine with the subframe unfinished. Hot plugging the cable or improperly coupling the cable may also cause the system to hang. The safety timer as described below can be used to drive the display into a safe state in the event of potentially damaging faults. Because a pathological condition that causes the power to the display to be wholly disrupted is also a "safe state" for the display, the safety timer need only address the conditions during which power is supplied to the display chip substrate.

Figure 4:
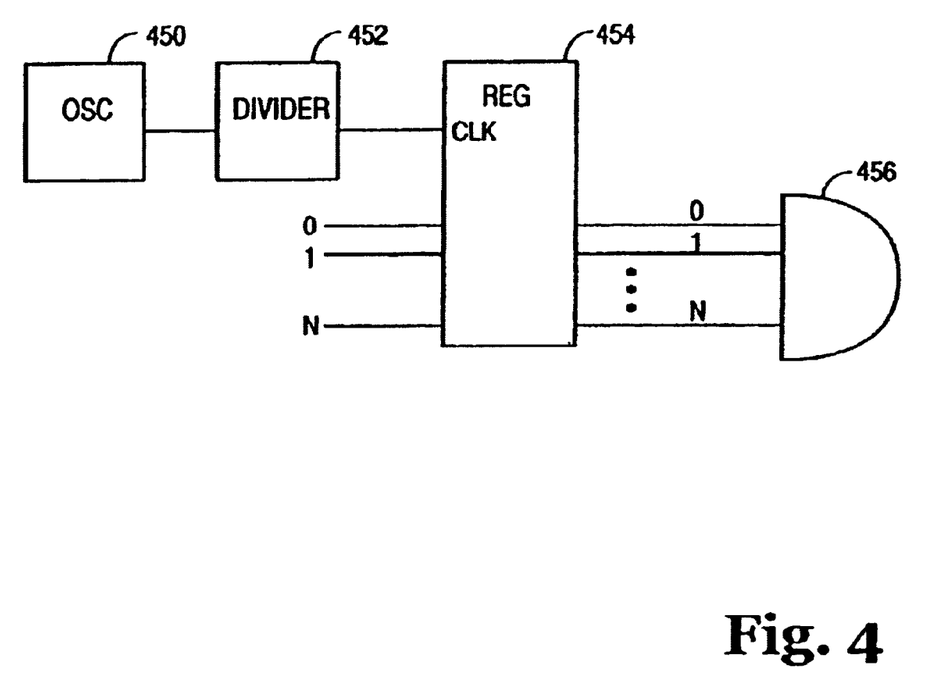
FIG. 4 is a block diagram of a safety timer of one embodiment of the invention.

FIG. 4 shows a block diagram of a safety timer of one embodiment of the invention. An oscillator 450 independent of the clock that drives the remainder of the display chip is employed to provide the safety timer clock. A clock divider 452 may optionally be employed to expand the period during which indicators of proper function will be collected from the fundamental frequency of the oscillator. An arbitrarily large number of indicators (0-N) may be collected during the period and stored in a register 454 or series of flip flops. Individual register positions are then effectively ANDed together or an expected set of indicators may be compared with a set of indicators actually received. Other methods of determining if all indicators have been received are within the scope and contemplation of the invention. If all the indicators are received during the specified period, the system is then deemed to be working properly. If all the indicators were not received during the specified period, a result at the AND 456 is false and the timer drives the display into a safe state. A safe state is defined in one embodiment as having a CGV of zero volts and all the pixels driven to zero volts. Reset, the safe state, is maintained until all the indicators are collected during an appropriate time period. Thus, if the deficiency is a permanent condition, the reset will be permanently maintained until the system is fixed. If the failure to receive an indicator is transient, possibly on the next oscillator cycle, the reset will be released. Significantly, it is important during reset to allow the interface 210 on substrate 202 to continue to receive signals, otherwise, a timer will never come out of reset.

Figure 5:
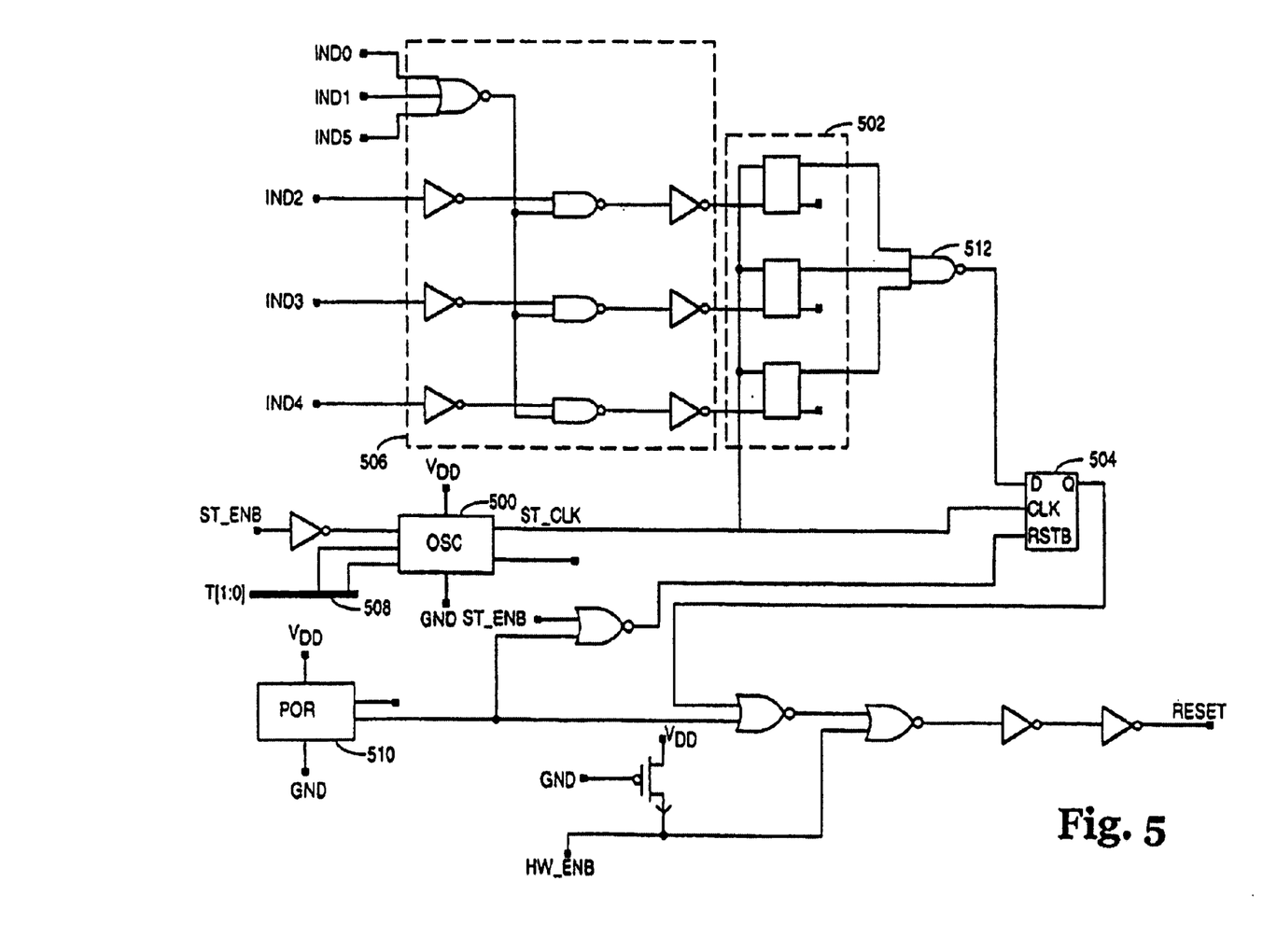
FIG. 5 is a schematic of a safety timer of one embodiment of the invention.

FIG. 5 shows a schematic of a safety timer of one embodiment of the invention. A plurality of indicators, IND0 through IND5, are fed into combinational logic 506. The indicators may be signals available in raw form on the display chip or signals derived from additional combinational logic (not shown) that is also formed on the display chip. The results of combinational logic 506 are retained in flip flops 502 and combined by NAND gate 512 for storage of a single signal in flip flop 504. The independent oscillator 500 provides all clocking for the safety timer circuit. Oscillator 500 includes a divider circuit which is driven by T signals 508. The T signal is a two bit signal which provides four possible clock periods from oscillator 500. The T signal may be provided by a register in the register space. The power on reset (POR) circuit 510 is also provided to ensure that the safety timer provides a reset at power on and allows the system to stabilize before releasing the reset or safety mode. In one embodiment, on reset, all register values on the display chip return to default values when the timer comes out of reset. This is desirable because it is assumed that a pathological condition usually causes the timer to force the chip into safe mode, or reset. Thus, it is reasonable to presume that there may have been some corruption of register values during that pathological condition. By returning the registers to default values, any corrupted values are overwritten. A hard wired enable (HW_ENB) is supplied so that the timer can be permanently disabled if desired for a particular application or system. Safety timer enable ($ST_{13}$ ENB) may be used to temporarily disable the safety timer when such is desired, as is certain test cases.

The particular indicators selected may vary between different designs. However, the selection of indicators will affect the combinational logic 506 required. In the shown embodiment, IND0, IND1, and IND5, collectively, indicate whether a write to any register in the control register space of the display chip has occurred. IND2, IND3, and IND4 reflect whether a write to specific registers in the control register block has occurred. For example, IND2 may indicate whether the load register for the high voltage platform has been written to, IND3 might indicate whether a frame start register has been written to, and IND4 might indicate whether a standby register has been written. The standby register causes the DACs to power down when not physically driving data to the display. This is desirable because the DACs consume a significant amount of power and also running constantly may exhibit undesirable heat characteristics. All three of the above-noted indicators occur every frame for normal operation. For example, every frame must be started by a write to the frame start register, and it is necessary to load the high power platform to cause illumination of the array via the LED drivers, as well as to adjust the CGV. Thus, if the clock period of safety timer clock (ST_CLK) is equal to the frame rate, it is necessarily the case that all indicators should be received during the ST_CLK period.

In addition to selecting signals which would necessarily occur within a frame, in one embodiment of the invention, indicators are selected so that at least one indicator is provided along each channel of the LVDS cable. This has the advantage of permitting identification of errors related to damage to a single channel, for example, as a result of kinking of the cable. The above-described embodiment relies on register writes as the basis for operation of the safety timer. Other suitable indicators include pixel clock activity, LUT writes, selected data wires, and even cover glass switching. It is, of course, possible in principle to examine every incoming signal to ensure that all expected signals are received during each frame. However, that becomes unjustifiably overhead intensive with corresponding circuit size and power costs. Thus, by selecting a subset of indicators reflective of the faults of most concern to the system, a safety timer can be effectively implemented which protects the display subsystem from permanent damage as a result of those faults. Notably, the timer does not merely identify the existence of a fault condition and report, e.g. to the display controller, for corrective action. Rather, the safety timer drives the reset signal that places the display in a safe state.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method of forming a display having a lookup table (LUT), said method comprising:
  forming a display on a first substrate;
  forming a digital to analog converter (DAC) on the first substrate with the display, wherein the DAC is coupled to the display; and
  forming a lookup table (LUT) on the first substrate, wherein the LUT is coupled to the DAC.

2. The method of claim 1, further comprising:
  storing a plurality of LUT data sets in a storage device on a second substrate; and
  selecting with a state machine which LUT data set of the plurality of LUT data sets are to be loaded into the LUT.

3. The method of claim 2, wherein the state machine cycles through a sequence of LUT data sets selected from the group consisting of R, G, B, $\overline{R}$, $\overline{G}$ and $\overline{B}$.

4. The apparatus of claim 3 wherein the sequence includes the pattern R, $\overline{G}$, B, $\overline{R}$, G, $\overline{B}$.

5. The method of claim 3, where the sequence alternates between a data set for a color and a data set for an inverted color.

6. The method of claim 2 further comprising:
  segregating incoming image data into monochrome subframes with a parser; and
  storing the subframes in the storage device with a memory controller.

7. The method of claim 2, wherein the LUT data sets map an m-bit value into an n-bit value where n>m.

8. The method of claim 2, wherein the LUT data sets adjust for non-linearity in the DAC and the display.

9. The method of claim 2, wherein the plurality of LUT data sets includes a data set corresponding to at least one of a temperature range, and a contrast control.

10. The method of claim 2, wherein the state machine cycles through R, G, B, LUT data sets and performs digital inversion of every second data set.

11. The method of claim 1, wherein the display has a data path, the data path having a width of r pixels wherein one LUT and one DAC are formed on the substrate for each of the r pixels of the data path, wherein r is a positive integer.

12. A method for a display system, said method comprising:
  forming a display on a first substrate;
  forming a lookup table (LUT) on the first substrate, wherein the LUT is coupled to the display;
  generating image frames from an image source;
  storing a plurality of subframes of the image frames;
  generating a plurality of LUT data sets corresponding to the stored plurality of subframes;

storing the LUT data sets external to the first substrate; and sequentially loading the LUT data sets into the lookup table on the first substrate with a state machine.

13. The method of claim 12, wherein the storage unit and the state machine are formed on a second substrate.

14. The method of claim 13, wherein the LUT data sets are stored on the second substrate prior to loading into the LUT.

15. The method of claim 12, wherein the subframes include a red (R) subframe, a green (G) subframe, and a blue (B) subframe.

16. The method of claim 12, wherein a sequence in which the LUT is loaded alternates between a subframe data set and an inverted subframe data set.

17. The method of claim 12, wherein the plurality of LUT data sets comprise sets corresponding to inverted subframes.

* * * * *